United States Patent
Lee et al.

(10) Patent No.: US 8,137,589 B2
(45) Date of Patent: Mar. 20, 2012

(54) NON STOICHIOMETRIC TETRAGONAL COPPER ALKALINE EARTH SILICATE PHOSPHORS AND METHOD OF PREPARING THE SAME

(75) Inventors: Chung Hoon Lee, Gyeonggi-do (KR); Walter Tews, Griefswald (DE); Gundula Roth, Levenhagen (DE); Stefan Tews, Greifswald (DE)

(73) Assignee: Seoul Semiconductor Co., Ltd., Seoul (KR)

( * ) Notice: Subject to any disclaimer, the term of this patent is extended or adjusted under 35 U.S.C. 154(b) by 606 days.

(21) Appl. No.: 12/196,923

(22) Filed: Aug. 22, 2008

(65) Prior Publication Data

US 2009/0050849 A1  Feb. 26, 2009

(30) Foreign Application Priority Data

Aug. 22, 2007 (KR) .................. 10-2007-0084659
Jul. 29, 2008 (KR) .................. 10-2008-0074241

(51) Int. Cl.
  *C09K 11/70* (2006.01)
  *C09K 11/02* (2006.01)
(52) U.S. Cl. .................. 252/301.6 R; 252/301.4 R
(58) Field of Classification Search ............ 252/301.4 F, 252/301.4 H, 301.4 R; 313/467, 468; 257/E33.061, 257/E31.029
See application file for complete search history.

(56) References Cited

U.S. PATENT DOCUMENTS

| | | | |
|---|---|---|---|
| 2,110,162 A | 3/1938 | Leverenz | |
| 2,402,760 A | 6/1946 | Leverenz | |
| 2,570,136 A | 10/1951 | Lyon | |
| 2,617,773 A | 11/1952 | Nagy et al. | |
| 2,719,128 A | 9/1955 | Kressin | |
| 2,780,600 A | 2/1957 | Wollentin | |
| 3,143,510 A | 8/1964 | Bakker | |
| 3,598,752 A | 8/1971 | Sisneros et al. | |
| 3,644,212 A | 2/1972 | McAllister et al. | |
| 3,893,939 A | 7/1975 | DeKalb et al. | |
| 3,905,911 A | 9/1975 | Kelsey et al. | |
| 4,215,289 A | 7/1980 | De Hair et al. | |
| 4,770,950 A | 9/1988 | Ohnishi | |
| 4,972,086 A | 11/1990 | Bryan et al. | |

(Continued)

FOREIGN PATENT DOCUMENTS

AT  410266  3/2003

(Continued)

OTHER PUBLICATIONS

International Search Report dated Feb. 11, 2009 for PCT Application No. PCT/KR2008/004733.

(Continued)

*Primary Examiner* — Jerry Lorengo
*Assistant Examiner* — Lynne Edmondson
(74) *Attorney, Agent, or Firm* — H.C. Park & Associates, PLC

(57) ABSTRACT

Disclosed are non stoichiometric Copper Alkaline Earth Silicate phosphors activated by divalent europium for using them as high temperature stable luminescent materials for ultraviolet or daylight excitation. The phosphors are represented as the formula $(Ba_uSr_vCa_wCu_x)_{3-y}(Zn,Mg,Mn)_zSi_{1+b}O_{5+2b}:Eu_a$. The nonstoichiometric tetragonal silicate is prepared in a high temperature solid state reaction with a surplus of silica in the starting mixture. Furthermore, luminescent tetragonal Copper Alkaline Earth Silicates are provided for LED applications, which have a high color temperature range from about 2,000K to 8,000K or 10,000K showing a CRI with Ra=80~95, when mixed with other luminescent materials.

10 Claims, 5 Drawing Sheets

U.S. PATENT DOCUMENTS

| | | | |
|---|---|---|---|
| 5,032,316 A | 7/1991 | Takahashi et al. | |
| 5,188,763 A * | 2/1993 | Chenot et al. | 252/301.5 |
| 5,433,295 A | 7/1995 | Murphy | |
| 5,472,636 A | 12/1995 | Forster et al. | |
| 5,518,808 A | 5/1996 | Bruno et al. | |
| 5,770,110 A | 6/1998 | Schrell et al. | |
| 5,770,111 A | 6/1998 | Moriyama et al. | |
| 5,853,614 A | 12/1998 | Hao et al. | |
| 5,952,681 A | 9/1999 | Chen | |
| 5,965,192 A | 10/1999 | Potter | |
| 5,998,925 A | 12/1999 | Shimizu et al. | |
| 6,045,722 A | 4/2000 | Leblans et al. | |
| 6,066,861 A | 5/2000 | Hohn et al. | |
| 6,373,184 B1 | 4/2002 | Suh et al. | |
| 6,472,765 B1 | 10/2002 | Sano et al. | |
| 6,565,771 B1 | 5/2003 | Ono et al. | |
| 6,670,751 B2 | 12/2003 | Song et al. | |
| 6,686,691 B1 | 2/2004 | Mueller | |
| 6,842,664 B2 | 1/2005 | Harada | |
| 6,982,045 B2 | 1/2006 | Menkara et al. | |
| 6,982,048 B1 | 1/2006 | Atwater | |
| 6,987,353 B2 | 1/2006 | Menkara et al. | |
| 7,019,335 B2 | 3/2006 | Suenaga | |
| 7,029,602 B2 | 4/2006 | Oshio | |
| 7,045,078 B2 | 5/2006 | Choi | |
| 7,138,770 B2 | 11/2006 | Uang et al. | |
| 7,189,340 B2 | 3/2007 | Shimomura et al. | |
| 7,206,507 B2 | 4/2007 | Lee et al. | |
| 7,229,571 B2 | 6/2007 | Ezuhara et al. | |
| 7,244,965 B2 | 7/2007 | Andrews et al. | |
| 7,332,746 B1 | 2/2008 | Takahashi et al. | |
| 7,554,129 B2 * | 6/2009 | Roth et al. | 257/100 |
| 7,608,200 B2 | 10/2009 | Seto et al. | |
| 7,679,101 B2 | 3/2010 | Ota et al. | |
| 7,679,281 B2 | 3/2010 | Kim et al. | |
| 2002/0015013 A1 | 2/2002 | Ragle | |
| 2003/0038295 A1 | 2/2003 | Koda | |
| 2003/0168636 A1 | 9/2003 | Dobson et al. | |
| 2004/0051111 A1 | 3/2004 | Ota et al. | |
| 2004/0136891 A1 | 7/2004 | Kijima et al. | |
| 2004/0206970 A1 | 10/2004 | Martin | |
| 2004/0251809 A1 | 12/2004 | Shimomura et al. | |
| 2005/0001537 A1 | 1/2005 | West et al. | |
| 2005/0029927 A1 | 2/2005 | Setlur et al. | |
| 2005/0117334 A1 | 6/2005 | Lee et al. | |
| 2005/0139846 A1 | 6/2005 | Park et al. | |
| 2005/0141048 A1 | 6/2005 | Mizutani | |
| 2005/0239227 A1 | 10/2005 | Aanegola et al. | |
| 2005/0264161 A1 | 12/2005 | Oaku et al. | |
| 2005/0274930 A1 | 12/2005 | Roth et al. | |
| 2005/0274972 A1 | 12/2005 | Roth et al. | |
| 2006/0158090 A1 | 7/2006 | Wang et al. | |
| 2006/0261309 A1 * | 11/2006 | Li et al. | 252/301.4 F |
| 2006/0261350 A1 | 11/2006 | Kawazoe et al. | |
| 2006/0267042 A1 | 11/2006 | Izuno et al. | |
| 2007/0029526 A1 | 2/2007 | Cheng et al. | |
| 2007/0247051 A1 * | 10/2007 | Kuze et al. | 313/483 |
| 2007/0284563 A1 | 12/2007 | Lee et al. | |
| 2008/0036364 A1 * | 2/2008 | Li et al. | 313/503 |
| 2008/0067472 A1 | 3/2008 | Roth et al. | |
| 2008/0067920 A1 | 3/2008 | Roth et al. | |
| 2008/0224163 A1 | 9/2008 | Roth et al. | |
| 2009/0050847 A1 * | 2/2009 | Xu et al. | 252/301.4 R |
| 2009/0134413 A1 | 5/2009 | Roth et al. | |
| 2009/0152496 A1 | 6/2009 | Roth et al. | |
| 2009/0195142 A1 * | 8/2009 | Song et al. | 313/483 |
| 2009/0262515 A1 | 10/2009 | Lee et al. | |
| 2009/0303694 A1 | 12/2009 | Roth | |
| 2010/0002454 A1 | 1/2010 | Lee et al. | |
| 2010/0207132 A1 | 8/2010 | Lee et al. | |

FOREIGN PATENT DOCUMENTS

| | | |
|---|---|---|
| CN | 1218084 | 6/1999 |
| CN | 1289454 | 3/2001 |
| CN | 1317537 | 10/2001 |
| CN | 1344777 | 4/2002 |
| CN | 1434521 | 8/2003 |
| CN | 1707819 | 12/2005 |
| DE | 10233050 | 2/2004 |
| DE | 10259946 | 7/2004 |
| EP | 0094132 | 11/1983 |
| EP | 0382295 | 8/1993 |
| EP | 0862794 | 9/1998 |
| EP | 0 896 994 | 2/1999 |
| EP | 1249873 | 10/2002 |
| EP | 1605030 | 12/2005 |
| EP | 2031038 | 3/2009 |
| GB | 1336053 | 11/1973 |
| GB | 2016034 | 9/1979 |
| JP | 31-1118 | 2/1956 |
| JP | 33-8177 | 9/1958 |
| JP | 38-6082 | 5/1963 |
| JP | 39-8803 | 5/1964 |
| JP | 47-6258 | 4/1972 |
| JP | 49-38994 | 10/1974 |
| JP | 55-135190 | 10/1980 |
| JP | 57-109886 | 7/1982 |
| JP | 61-258892 | 11/1986 |
| JP | 62-197487 | 9/1987 |
| JP | 5-78659 | 3/1993 |
| JP | 9-40946 | 2/1997 |
| JP | 9-153644 | 6/1997 |
| JP | 2001-115157 | 4/2001 |
| JP | 2001-308393 | 11/2001 |
| JP | 2002-057376 | 2/2002 |
| JP | 2002-094122 | 3/2002 |
| JP | 2002-97466 | 4/2002 |
| JP | 2002-173677 | 6/2002 |
| JP | 2002-335019 | 11/2002 |
| JP | 2002-359403 | 12/2002 |
| JP | 2002-368277 | 12/2002 |
| JP | 2003-064358 | 3/2003 |
| JP | 2003-152229 | 5/2003 |
| JP | 2003-183649 | 7/2003 |
| JP | 2003-224306 | 8/2003 |
| JP | 2003-321675 | 11/2003 |
| JP | 2004-006582 | 1/2004 |
| JP | 2004-010786 | 1/2004 |
| JP | 2004-71726 | 3/2004 |
| JP | 2004-127988 | 4/2004 |
| JP | 2004-134699 | 4/2004 |
| JP | 2004-192833 | 7/2004 |
| JP | 2005-167177 | 6/2005 |
| JP | 2006-073656 | 3/2006 |
| KR | 10-232395 | 12/1999 |
| KR | 20010032450 | 4/2001 |
| KR | 10-2001-0050839 | 6/2001 |
| KR | 20010101910 | 11/2001 |
| KR | 10-2002-0000835 | 1/2002 |
| KR | 10-2002-0053975 | 7/2002 |
| KR | 10-392363 | 7/2002 |
| KR | 10-2002-0079513 | 10/2002 |
| KR | 2003-0063211 | 7/2003 |
| KR | 10-2003-0082395 | 10/2003 |
| KR | 10-0426034 | 7/2004 |
| KR | 10-2004-0088418 | 10/2004 |
| KR | 10-2005-0008426 | 1/2005 |
| KR | 10-2005-0070349 | 7/2005 |
| KR | 10-2005-0098462 | 10/2005 |
| KR | 10-2005-0106945 | 11/2005 |
| KR | 10-2005-0117164 | 12/2005 |
| KR | 10-2005-0117165 | 12/2005 |
| KR | 10-0626272 | 9/2006 |
| KR | 10-2006-0134728 | 12/2006 |
| TW | I328885 | 3/1999 |
| WO | 96-32457 | 10/1996 |
| WO | 98-05078 | 2/1998 |
| WO | 98-12757 | 3/1998 |
| WO | 98-42798 | 10/1998 |
| WO | 00-19546 | 4/2000 |
| WO | 01-41215 | 6/2001 |
| WO | 02-054502 | 7/2002 |
| WO | 02-054503 | 7/2002 |
| WO | 02-089219 | 11/2002 |
| WO | 03-021691 | 3/2003 |
| WO | 2004-085570 | 10/2004 |

| WO | 2004-111156 | 12/2004 |
| WO | 2005068584 | 7/2005 |
| WO | 2005-109532 | 11/2005 |
| WO | 2005-112137 | 11/2005 |
| WO | 2006-043682 | 4/2006 |
| WO | WO 2006043682 A1 * | 4/2006 |
| WO | 2006-068359 | 6/2006 |
| WO | 2006-081803 | 8/2006 |
| WO | WO 2006109659 A1 * | 10/2006 |
| WO | 2007-035026 | 3/2007 |
| WO | 2007-055538 | 5/2007 |
| WO | 2007-069869 | 6/2007 |
| WO | 2007-114614 | 11/2007 |
| WO | 2009-028818 | 3/2009 |

OTHER PUBLICATIONS

T.L. Barry, "Fluorescence of Eu2+ Activated Phases in Binary Alkaline Earth Orthosilicate Systems", J. Electrochem. Soc.: Solid State Science (Nov. 1968), pp. 1181-1184.
H.G. Kang, et al., "Embodiment and Luminescence Properties of Sr2SiO5:Eu(yellow-orange phosphor) by Co-doping Lanthanide," Solid State Phenomena, vol. 124-126 (2007) pp. 511-514.
G. Roth, et al. "Advanced Silicate Phosphors for improved white LED", Phosphor Global summit Seoul/Korea, Mar. 5-7, 2007, pp. 1-39.
T.L. Barry, "Equilibria and Eu2+ luminescence of subsolidus phases bounded by Ba3MgSi2O8, Sr3MgSi2O8 and Ca3MgSi2O8," J. Electrochem. Soc., vol. 115(7) (1968), pp. 733-738.
G. Blasse, et al., "Fluorescence of Europium2+-activated silicates," Philips Res. Repts 23 (1968) pp. 189-199.
S.D. Jee, et al., "Photoluminescence properties of Eu2+-activated Sr3SiO5 Phosphors," J. Mater Sci. 41 (2006) pp. 3139-3141.
Unpublished U.S. Appl. No. 12/491,780, filed Jun. 25, 2009.
Lee, Chung-Hoon, et al., Unpublished U.S. Appl. No. 12/440,001; corresponds to WO2009-028818, published Mar. 5, 2009.
Search Report dated Aug. 21, 2007 for EP Application No. EP04106882.6.
Search Report dated Nov. 5, 2008 for EP Application No. EP06812549.1.
G. Blasse, B.C. Grabmeier, "Luminescent Materials", Springer, 1994, pp. 40-47.
G. Blasse and A. Bril, "Characteristic Luminescence", Philips Technical Review, 31 (1970) 304, pp. 306 & 310.
S. Shionoya, W.M. Yen, "Phosphor Handbook" CRC Press, 1999, Ch. 3.3, pp. 179-182.
G. Blasse, B.C. Grabmeier, "Luminescent Materials", Springer, 1994, p. 25.
J. Garcia Sole, L.E. Bausa, D. Jaque, "An Introduction to the Optical Spectroscopy of Inorganic Solids", Wiley, 2005, pp. 163-164.
P.A. Cox, "Transition Metal Oxides", Oxford University Press, 1995, p. 105.
B. Cordero, et al. "Covalent Radii Revisited", Dalton Trans., (2008), pp. 2832-2838.
G. Blasse, B.C. Grabmeier, "Luminescent Materials", Springer, 1994, pp. 87-90.
Feldman, C., "Inorganic Luminescent Materials: 100 Years of Research and Application", Adv. Funct. Matter, 2003, pp. 511-516.
Blasse, G., "Characteristic Luminescence", Philips Technical Review, vol. 31 (1970), pp. 304-332.
Declaration Under Rule 37 CFR 1.132 of Ulrich Kynast dated Sep. 6, 2008.
R.J. Angel et al., "Structure and twinning of single-crystal MgSiO3 garnet synthesized at 17 GPa and 1800 °C", American Mineralogist, 74 (1989) pp. 509-512.
Notice of Allowance dated May 4, 2009 issued in U.S. Appl. No. 11/024,702.
Non-final office action dated Jan. 13, 2010 issued in U.S. Appl. No. 11/569,060, filed Jun. 22, 2007.
Non-final office action dated Nov. 17, 2009 issued in U.S. Appl. No. 12/097,741, filed Oct. 9, 2008.
Non-final office action dated Nov. 2, 2009 issued in U.S. Appl. No. 12/098,263.
Non-final office action dated Nov. 14, 2008 issued in U.S. Appl. No. 11/024,722, filed Dec. 30, 2004.
Non-final office action dated May 29, 2009 issued in U.S. Appl. No. 11/024,722, filed Dec. 30, 2004.
Final office action dated Oct. 28, 2009 issued in U.S. Appl. No. 11/024,722, filed Dec. 30, 2004.
Non-final office action dated Nov. 29, 2006 issued in U.S. Appl. No. 11/024,722, filed Dec. 30, 2004.
Non-final office action dated Nov. 29, 2007 issued in U.S. Appl. No. 11/024,702, filed Dec. 30, 2004.
Non-final office action dated Jun. 22, 2006 issued in U.S. Appl. No. 11/024,702, filed Dec. 30, 2004.
Final office action dated Feb. 7, 2007 issued in U.S. Appl. No. 11/024,702, filed Dec. 30, 2004.
International Search Report dated Feb. 11, 2009 for PCT Application No. PCT/2008/004733.
Butler, "Fluorescent Lamp Phosphors", The Pennsylvania State University Press, 1980, pp. 281-284.
Shionoya, "Phosphor Handbook", edited under the auspiece of Phosphor Research Society, CRC Press, 1999, pp. 238-239, 241.
Van Gool, Philips Res. Rept. Suppl., 3, 1, 1961(pp. 1-9, 30-51, 84-85).
Shionoya, "Phosphor Handbook", edited under the auspiece of Phosphor Research Society, CRC Press, 1999, pp. 204-205.
Blasse, "Radiationless Processes in Luminescent Materials", Radiationless Processes, 1980, pp. 287-289, 293.
Butler, "Fluorescent Lamp Phosphors", The Pennsylvania State University Press, 1980, pp. 181-182.
Butler, "Fluorescent Lamp Phosphors", The Pennsylvania State University Press, 1980, pp. 175-176.
Bernhardt, Investigations of the Orange Luminescence of PbMoO4 Crystals, Phys. Stat.Sol.(a),91,643,1985, pp. 643-647.
Shionoya, S., et al.(Eds.), "Principal phosphor materials and their optical properties" in Phosphor Handbook, CRC Press, 1999, p. 826.
Ralchenko, Yu., Kramida, A.E., Reader, J. and NIST ASD Team (2008). NIST Atomic Spectra Database (version 3.1.5), [Online]. Available: http://physics.nist.gov/asd3 [Feb. 27, 2009]. National Institute of Standards and Technology, Gaithersburg, MD.
Yang, "Conversion Fluorescence in Er3+Yb3+Co-Doped Oxy-Fluoride Compound Materials Based on GeO2," Natural Science Journal of Xiangtan University, vol. 23, No. 2, 2001, pp. 37-41.
International Search Report dated Feb. 27, 2009 for PCT Application No. PCT/KR2008/004734.
X.W.Sun, et al. "Pulsed Laser Deposition of Silicate Phosphor Thin Films", Appl. Phys. A, 69, 1999, 5 pages.
W.L. Wanmaker, et al. "Luminescence of Phosphors Based on the Host Lattice ABGe2O6(A,B=Ca,Sr,Ba)" Journal of Solid State Chemistry 3, (1971),pp. 194-196.
N. S. Akhmetov, "Inorganic Chemistry", Moscow "Vysshaya Shkola", 1975; (partial translation; translated pp. 332-333, 372-373, 384-385, 427, 432, 436, 445, 471, 476, 486, 491, 496-497, 501, 546-549).
Markovsky L, Ya. Et al., Phosphors (Moscow-Leningrad, Khimiya Publishers, 1966, p. 7 (partial translation).
Non-final office action dated Aug. 12, 2009 issued in U.S. Appl. No. 11/569,060, filed Jun. 22, 2007.
Chinese Office Action dated Dec. 28, 2007 issued in China App No. 200580150173 corresponding to U.S. Appl. No. 11/569,060.
Chinese Office Action dated Dec. 28, 2007 issued in China App No. 200580016844.4 corresponding to U.S. Appl. No. 11/568,769.
Shenstone, A.G., "The Third Spectrum of Copper(Cu III)", Journal of Research of the National Bureau of Standards—A. Physics and Chemistry, vol. 79A, No. 3, May-Jun. 1975, pp. 497-521.
Lever, A.B.P., "Inorganic Electronic Spectroscopy", 2nd ed., Elsevier, 1984, pp. 355 and 557-559.
Dubicki, Lujcan et al., "The First d-d Fluorescence of a six-Coordinate Copper(II) Ion", J.Am.Chem.Soc., 1989, No. 111, pp. 3452-3454.
Scacco, A., et al., "Optical Spectra of Cu2+ Ions in LiF Crystals", Radiation Effects and Defects in Solids, vol. 134, 1995, pp. 333-336.
Shionoya, S., et al.(Eds.), "Principal phosphor materials and their optical properties" in Phosphor Handbook, CRC Press, 1999, pp. 231-255.

Yang, Ping et al., "Photoluminescence of Cu+ doped and Cu2+ doped ZnS nanocrystrallites", Journal of Physics and Chemistry of Solids, No. 63, 2002, pp. 639-643.

Suyver, J.F., et al.,"Luminescence of nanocrystalline ZnSe:Cu", Applied Physics Letters, vol. 79, No. 25, Dec. 17, 2001, pp. 4222-4224.

Bol, Ageeth A., et al., "Luminescence of nanocrystalline ZnS:Cu2+", Journal of Luminescence, No. 99, 2002, pp. 325-334.

Non-final office action mailed May 23, 2007 for U.S. Appl. No. 11/024,722, filed Dec. 30, 2004.

Declaration under 37 CFR 1.132 by Ulrich Kynast, dated Aug. 24, 2007.

Final office action dated Oct. 22, 2007 issued in U.S. Appl. No. 11/024,722, filed Dec. 30, 2004.

"Phosphors for Mercury Lamps" https://www.lamptech.co.uk/documents/M14%20Phosphors.htm 2003 (2 pages).

Search Report dated Apr. 11, 2006 for EP Application No. EP04106880.0.

International Search Report dated Aug. 12, 2005 for PCT Application No. PCT/KR2005/001287.

International Search Report dated Aug. 12, 2005 for PCT Application No. PCT/KR2005/001288.

International Search Report dated Oct. 13, 2005 for PCT Application No. PCT/KR2005/002333.

International Search Report dated Oct. 24, 2005 for PCT Application No. PCT/KR2005/002332.

International Search Report dated Feb. 20, 2007 for PCT Application No. PCT/KR2006/004716.

International Search Report dated Jul. 12, 2007 for PCT Application No. PCT/KR2007/001587.

International Search Report dated Mar. 21, 2007 for PCT Application No. PCT/KR2006/005500.

Chinese Office Action dated Feb. 15, 2008 issued in Chinese Patent App No. 20051002304.2 corresponding to U.S. Appl. No. 11/024,722.

Search Report dated Feb. 2, 2009 for EP Application No. EP08014684.

Joung Kyu Park, et al., "Luminescence Characteristics of Yellow Emitting Ba3SiO5:EU2+ Phosphor", Journal of Materials Science 40 (2005), pp. 2069-2071, XP-002511068.

Joung Kyu Park, et al., "Silicate Phosphors for White LEDs Identified Through Combinatorial Chemistry", Electrochemical and Solid-State Letters, 10 (2), J15-J18, (2007), XP-002511067.

European Search Report of Sep. 23, 2010 in European Patent Appl. No. 10 16 4970.

TW Office Action of Sep. 10, 2010 in TW Patent Appl. No. 098123458.

IP Australia Office Action dated Jul. 2, 2010 for AU Patent Appl. No. 2005-319965, corresponding to U.S. Appl. No. 12/098,263.

Non-Final Office Action dated Aug. 10, 2010 in U.S. Appl. No. 12/731,811.

Non-Final Office Action dated Aug. 18, 2010 in U.S. Appl. No. 11/948,813.

European Search Report of Oct. 26, 2010 in EP 10 17 7817, corresponding to U.S. Appl. No. 11/024,722.

CN Office Action dated Feb. 5, 2010 in CN Appl. No. 2005100023042.

Final Office Action dated Sep. 9, 2010 in U.S. Appl. No. 11/568,769.

Non-Final Office Action dated Apr. 30, 2010 in U.S. Appl. No. 11/568,769.

Final Office Action dated Jun. 21, 2010 in U.S. Appl. No. 11/569,060.

Non-Final Office Action dated Aug. 10, 2010 in U.S. Appl. No. 11/024,722.

Final Office Action dated Nov. 12, 2010 in U.S. Appl. No. 12/097,741.

Non Final Office Action dated Jun. 16, 2010 in U.S. Appl. No. 12/097,741.

EP Search Report dated Oct. 6, 2010 in EP Appl No. 07745750.5—corresponding to U.S. Appl. No. 12/295,438.

EP Search Report dated Sep. 1, 2010 in EP Appl No. 08015119 correponding to U.S. Appl. No. 12/440,001.

Non Final Office Action dated Aug. 17, 2010 in U.S. Appl. No. 11/948,845.

Non Final Office Action dated Mar. 17, 2010 in U.S. Appl. No. 11/024,722.

Final Office Action dated May 11, 2010 in U.S. Appl. No. 12/098,263.

Final Office Action dated Nov. 30, 2010 in U.S. Appl. No. 11/024,722.

Non Final Office Action dated Nov. 24, 2010 in U.S. Appl. No. 12/093,441.

Non Final Office Action dated Nov. 26, 2010 in U.S. Appl. No. 12/440,001.

Indian Office Action of Indian Application No. 2468/KOLNP/2007 issued on Jan. 28, 2011, corresponding to U.S. Appl. No. 12/098,263.

Notice of Allowance of U.S. Appl. No. 12/440,001 dated on Nov. 7, 2011.

* cited by examiner

[Fig. 1]
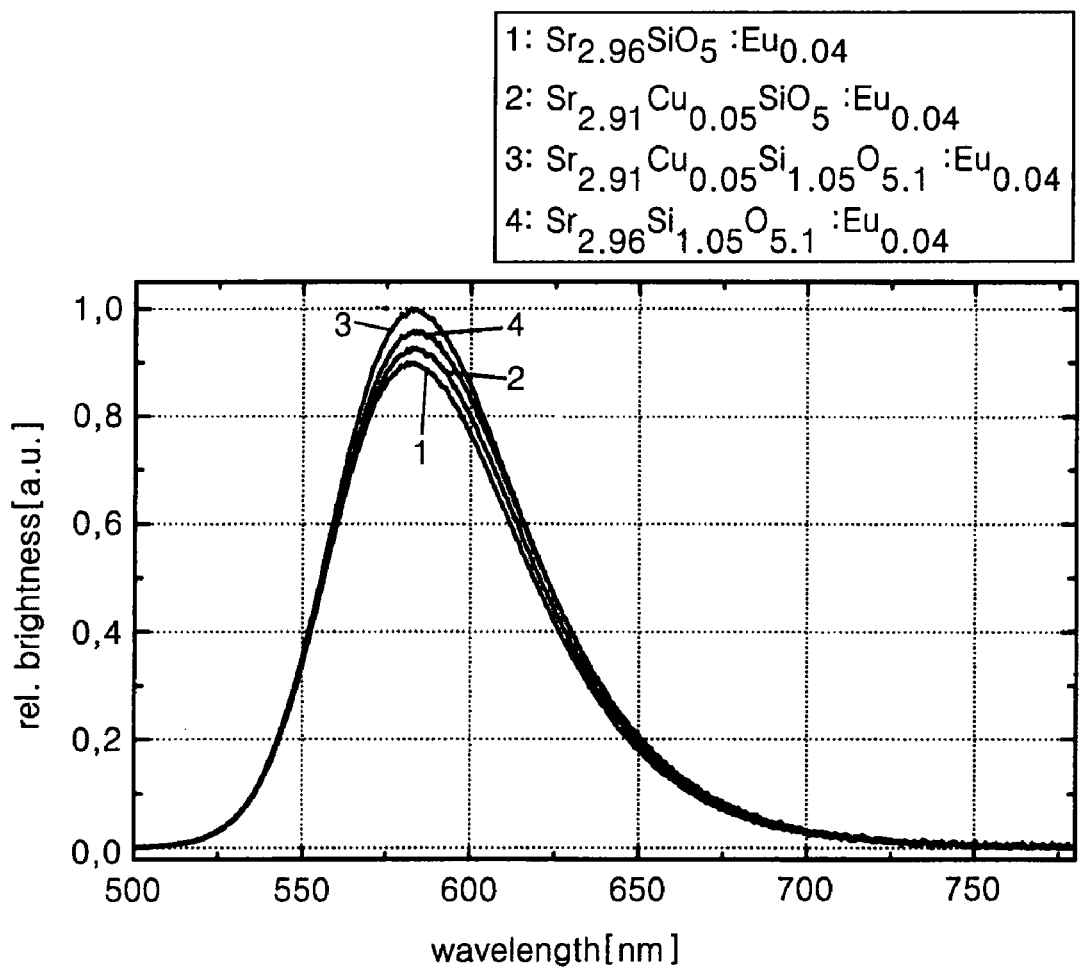

[Fig. 2]
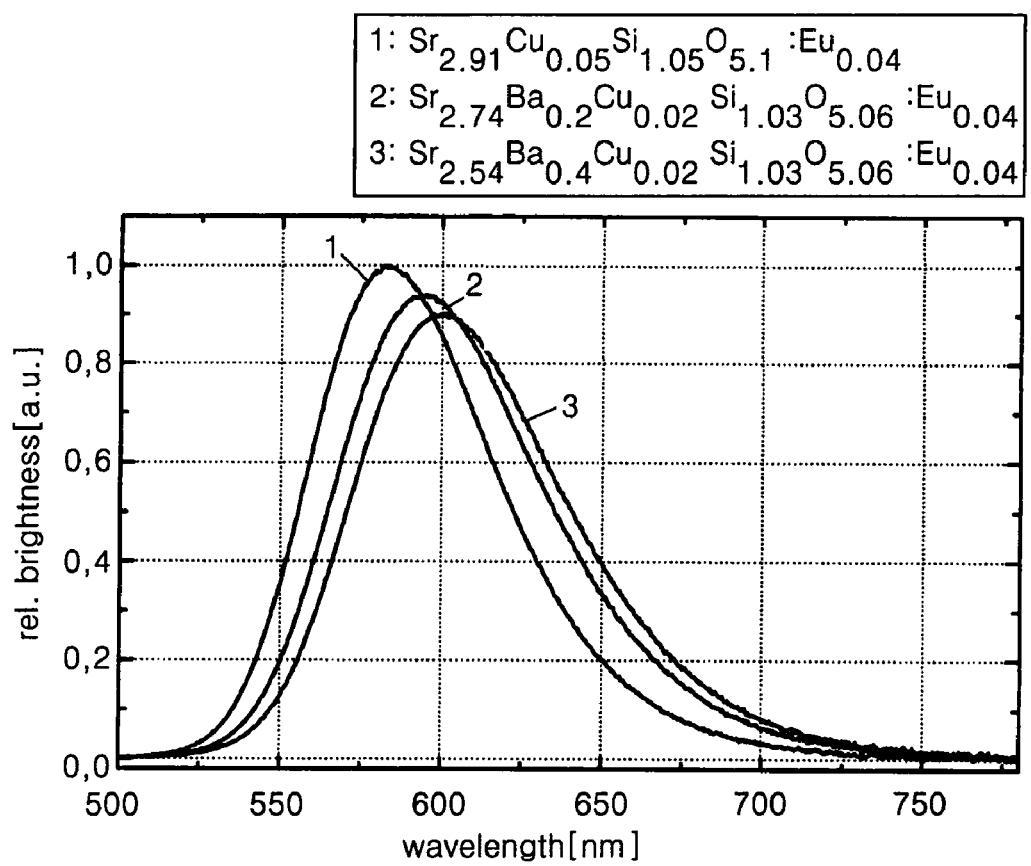

[Fig. 3]
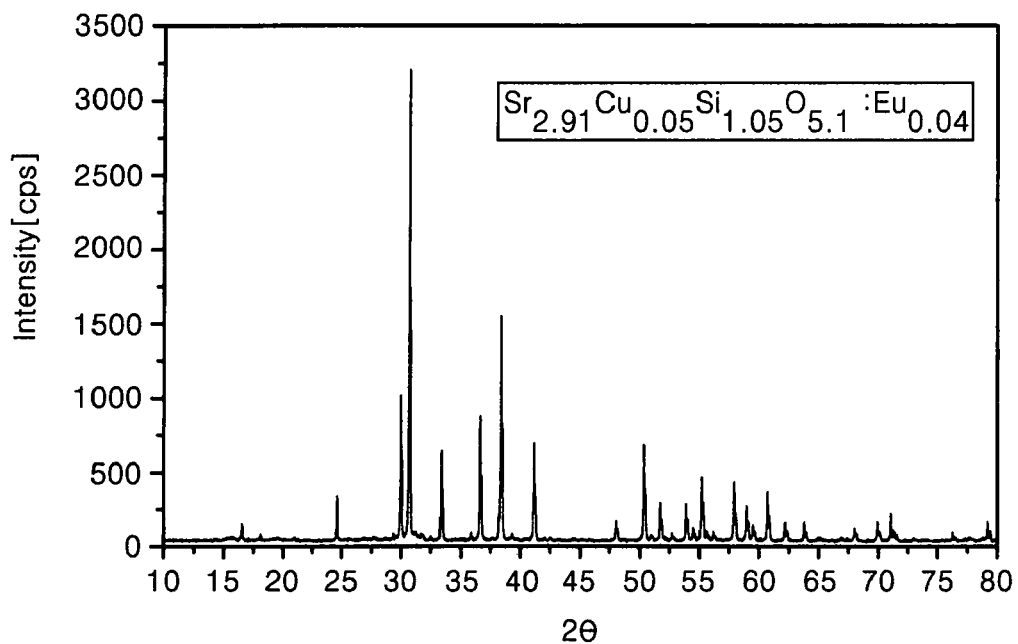
[Fig. 4]
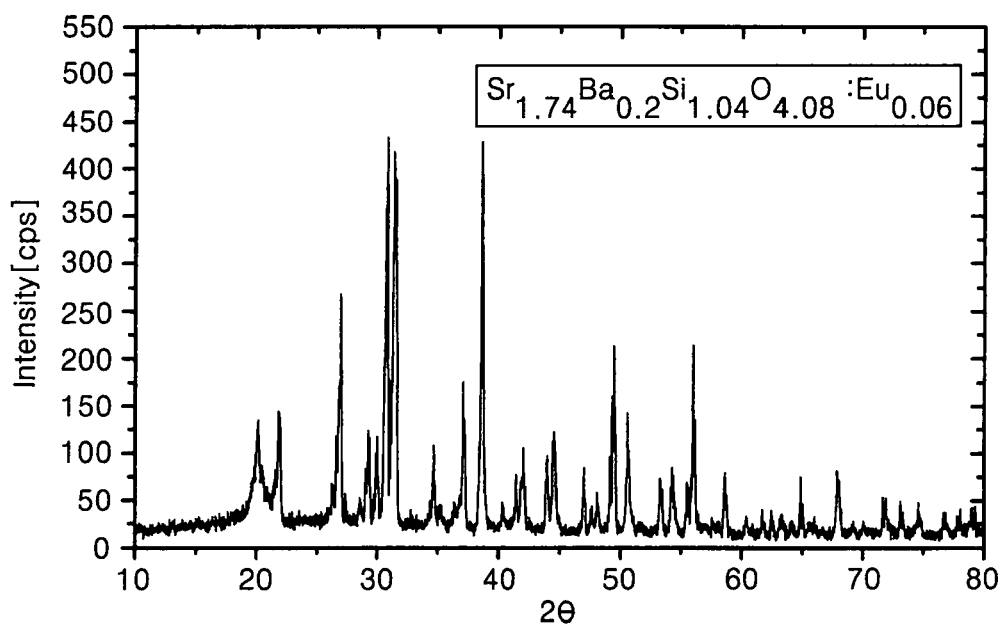

[Fig. 5]
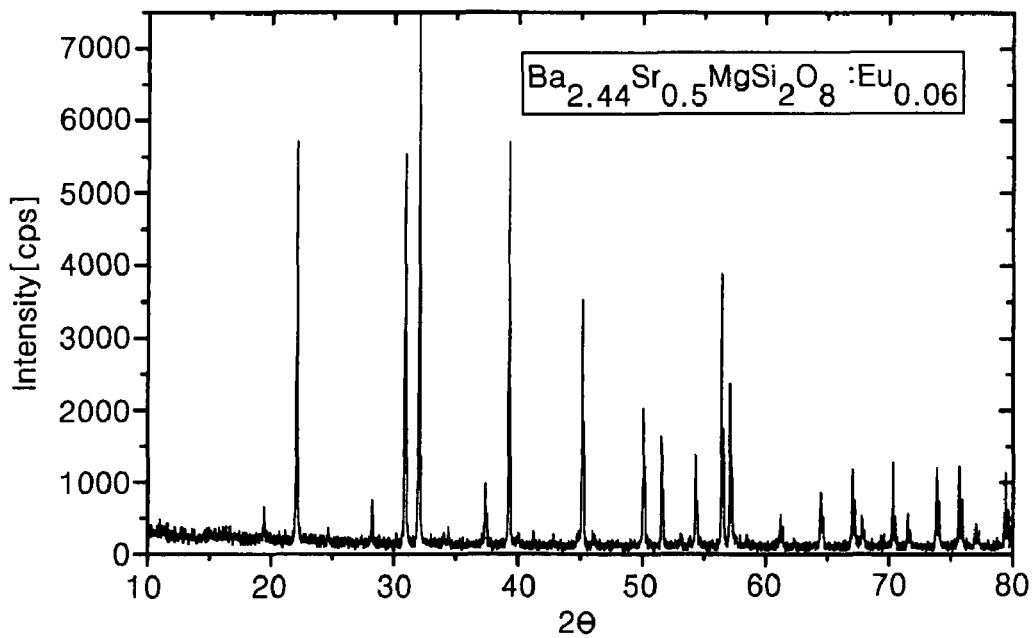
[Fig. 6]
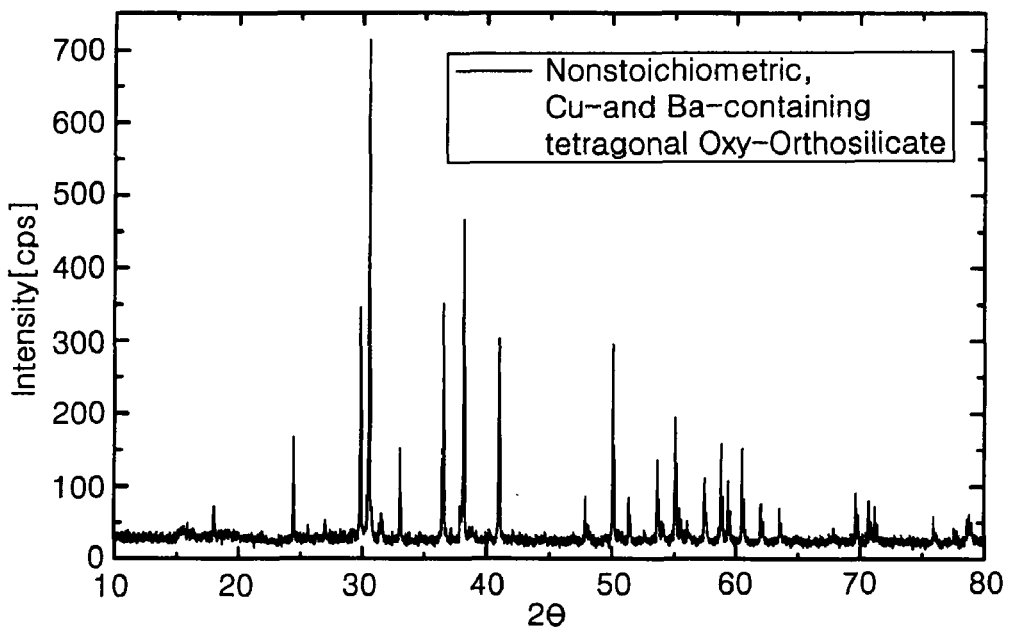

[Fig. 7]
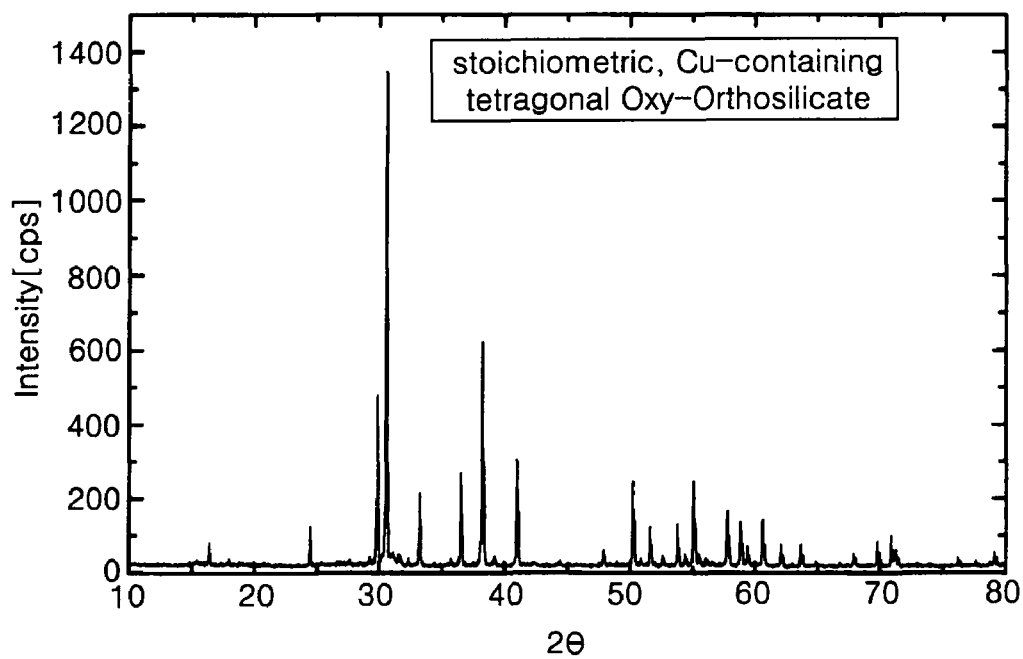

NON STOICHIOMETRIC TETRAGONAL COPPER ALKALINE EARTH SILICATE PHOSPHORS AND METHOD OF PREPARING THE SAME

CROSS-REFERENCE TO RELATED PATENT APPLICATIONS

This application claims priority to Korean Patent Application No. 10-2007-0084659 (filed Aug. 22, 2007), and Korean Patent Application No. 10-2008-0074241 (filed Jul. 29, 2008) in the Korean Intellectual Property Office, the disclosures of which are incorporated herein in their entirety by reference.

BACKGROUND OF THE INVENTION

1. Field of the Invention

The present invention relates to Alkaline Earth Silicate phosphors, and more particularly to non stoichiometric tetragonal Copper Alkaline Earth Silicate phosphors activated by divalent europium for using them as temperature stable luminescent materials for ultraviolet or daylight excitation.

2. Description of the Related Art

Stoichiometric silicates such as Orthosilicates, Disilicates and Chlorosilicates are well known as converter materials for short or long wave excitation like ultraviolet as well as daylight radiation. (G. Roth; et al. "Advanced Silicate Phosphors for improved white LED" (Phosphor Global summit Seoul/Korea, Mar. 5-7, 2007))

Especially, blue light excitation from an LED leads to a white light or color for demand for several applications. In the last years, the use of silicates has been increasing for LED application.

The LEDs and especially the High Power LEDs produce a lot of heat during operation. Additionally, LEDs have to withstand high ambient temperature above 80° C. Phosphors themselves have a system depending on temperature-behavior. The brightness of most phosphors is decreasing with increasing temperatures.

This so-called temperature quenching depends on the interactions between activator and host lattice and is influenced by the composition of the matrix, structure, lattice effects, concentration as well as the kind of activator. In particular, the strength of the bonding within the crystal matrix is influencing the extension of the lattice parameters and from this the emission properties of the activator ions.

Furthermore, by increasing the temperature the oscillation of the ions within the lattice becomes higher. Because of this, the probability of an interaction with the activator ions becomes higher resulting in an increasing loss of exciting energy in form of heat. This so-called Photon-Photon Coupling strongly depends on the structure and the surrounding of the activator ions. The more rigid is the crystal lattice, the lower is the interaction between ions and activator.

The brightness of Orthosilicates, Disilicates as well as Chlorosilicates activated by divalent Europium decreases strongly with higher temperatures up to 150° C. because the lattice is not so rigid and the strength of the bonding is not so high.

This effect leads e.g. to a changing of the color of the LED during operation. This is a serious disadvantage of the use of common Silicates known until now for LED applications. Furthermore, the sensitivity against water is comparably high caused by the weak lattice and a highly heteropolar bonding between the Silicate ion and the Alkaline Earth ions.

Silicate phosphors have been developed in the recent years as luminescent materials for white LEDs. (WO 02/054503, WO 02/054502, WO 2004/085570)

Orthosilicates as luminescent material with an excitability from short ultraviolet radiation up to visible light can be used as phosphors for fluorescent lamps. (Barry, T. L., "Fluorescence of $Eu^{2+}$-activated phases in binary Alkaline Earth Orthosilicate systems," J. Electrochem. Soc., 115, 1181 (1968))

Co-doped Tristrontium-silicates are disclosed as yellow-orange luminescent material (H. G. Kang, J. K. Park, J. M-Kom, S. C. Choi; Solid State Phenomena, Vol 124-126 (2007) 511-514), Divalent europium as activator for silicates (S. D. Jee, J. K. Park, S. H. Lee; "Photoluminescent properties of $Eu^{2+}$ activated $Sr_3SiO_5$ Phosphors," J. Mater Sci. 41 (2006) 3139-3141 and Barry, T. L.; "Equilibria and $Eu^{2+}$ luminescence of subsolidus phases bounded by $Ba_3MgSi_2O_8$, $Sr_3MgSi_2O_8$ and $Ca_3MgSi_2O_8$," J. Electrochem. Soc., 115, 733, 1968), and fluorescence for excitation by UV and blue radiation is disclosed in several Silicate systems as Orthosilicates and Disilicates. (G. Blasse, W. L. Wanmaker, J. W. ter Vrugt and a. Bril; "Fluorescence of $Europium^{2+}$-activated silicates," Philips Res. Repts 23, 189-200, 1968)

All these phosphors have the disadvantage that they have strong temperature quenching and a strong shift of the emission band with the temperature. The emission intensity can be dropped down to 50% at 150° C.

SUMMARY OF THE INVENTION

An object of the present invention is to provide more stable phosphors with a more rigid surrounding of the activator ions in a Silicate matrix and to provide Silicate phosphors with high temperature stability and lower sensitivity against humidity.

Other object of the present invention is to provide high temperature stable tetragonal Copper Alkaline Earth Silicate phosphors activated by at least divalent Europium which emits light between about 500 nm to 630 nm and a manufacturing method thereof.

Another object of the present invention is to provide luminescent tetragonal Copper Alkaline Earth Silicate for LED applications, which have high color temperature range from about 2,000K to 8,000K or 10,000K showing a CRI of 80~95, especially 90~95, when mixed together with other phosphors.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings:

FIG. 1 shows emission spectra of new non-stoichiometric Oxyorthosilicates compared with stoichiometric phosphors; both with and without Copper at 450 nm excitation wavelength.

FIG. 2 shows the influence of Ba on the emission spectra of new tetragonal Oxyorthosilicates.

FIG. 3 shows X-ray diffraction patterns of a non stoichiometric Copper containing Oxy-Orthosilicate having tetragonal structure.

FIG. 4 shows X-ray diffraction patterns of a non-stoichiometric yellow emitting Orthosilicate having Olivine structure.

FIG. 5 shows X-ray diffraction patterns of a blue emitting Ortho-Disilicate having Merwinite structure.

FIG. 6 shows X-ray diffraction patterns of a non-stoichiometric Oxyorthosilicate with 0.4 Mol Ba.

FIG. 7 shows X-ray diffraction patterns of a stoichiometric Strontium-Oxyorthosilicate

DETAILED DESCRIPTION OF THE ILLUSTRATED EMBODIMENTS

Reference will now be made in detail to the illustrated embodiments of the present invention, which are illustrated in the accompanying drawings.

The energetic ground level of divalent Europium $4f^7$ can be excited by ultraviolet as well as blue radiation. Divalent Europium emits light in dependence on the crystal field splitting from around 365 nm in the ultraviolet region at small crystal field splitting, e.g. in Tetra borate phosphors, up to 650 nm with red emission at high crystal field splitting, e.g. in Nitrides.

The emission itself depends on both the covalence, the so-called nephelauxetic effect, and the strength of the crystal field. The strength of the crystal field depends on the distance of activator ions and oxygen within the host lattice. Both effects lead to decreasing and splitting of the excited $4f^65d$ level of divalent Europium and result in a shifting of the emission to longer wavelength and smaller energy of the emission.

The difference between exciting radiation and emitting radiation is the Stokes shift. In Orthosilicates, Disilicates as well as Chlorosilicates, the Stokes shift is between 160 nm and 360 nm, and depends on the exciting radiation as well as the excitability of divalent Europium within the host lattice.

In Orthosilicates, e.g. the activator ion Europium 2+ is surrounded by oxygen ions in different distance caused by the orthorhombic structure. Best temperature stability has been observed with Barium rich systems, in which the Europium ions have shortened the host lattice and stabilized the crystal structure.

The introduction of more Strontium or Calcium or other cations besides Barium into the Orthosilicate lattice can disturb the symmetry near of the activator ions and leads to energetic traps and stronger interactions between Europium and the lattice traps. These traps play an important role within the temperature quenching process, and the energy transfer process within the crystal is disturbed. Furthermore, the sensitivity against humidity is increasing with increasing number of lattice defects like traps.

An important point is the reduction of interactions between the rare earth metal Europium and the stabilization of its surrounding. That has been realized by developing Tetragonal Copper Alkaline Earth Silicates (CSE) activated by divalent Europium. Divalent Copper ions within tetragonal silicate structure lead to lattice parameters (e.g. $(Cu, Sr)_3SiO_5$ with $a=6.91$ Å; $c=9.715$ Å) smaller than for tetragonal lattice without copper ($Sr_3SiO_5$ with $a=6.93$ Å; $c=9.73$ Å).

The lattice parameters are strongly different from lattice parameters of the well-known Orthosilicates with $a=5.682$ Å, $b=7.09$ Å and $c=9.773$ Å. Here, the surrounding of divalent Europium is influenced by the orthorhombic structure.

Tetragonal Copper Alkaline Earth Silicates show more stable temperature behavior above 100° C. Here, copper is very important for the phosphor preparation. By incorporation of copper into a common Alkaline Earth Silicate, three effects could be obtained.

Firstly, copper is accelerating the solid state reaction during the heating process. Secondly, copper containing phosphors show improved emission intensities compared to luminescent materials having not that component in the host lattice and is stabilizing the surrounding around the activator. Thirdly, the copper containing phosphors show a shifting of the emission to longer wavelength.

Copper as a basic element doesn't react as activator but the use of this ion leads to an influence on the crystal field splitting as well as the covalence. Surprisingly, the incorporation of copper accelerates the solid state reaction during temperature processing and leads to homogeneous high brightness phosphor which is stable at high temperatures.

Copper(II) has a smaller ionic radius (about 60 pm) and electro-negativity (1.8) is higher than the electro-negativity of Barium, Strontium and Calcium (1). Furthermore, Copper(II) has a positive electrochemical reduction potential of +0.342 in contradiction to the negative potential of Alkaline Earth metals (−2.8 to −2.9). It is shown that copper is stabilizing the emission of Europium within the silicate host lattice.

Furthermore, the water stability can be improved. It is known that Alkaline Earth Silicate phosphors are unstable in water, air humidity, water steam or polar solvents.

Silicates with orthorhombic as well as Akermanite or Merwinite structures show more or less high sensitivity to water, air humidity, water steam or polar solvents caused by high basicity. Due to higher covalence and a lower basicity as well as a positive reduction potential, the incorporation of copper as a basic matrix component in a host lattice improves the behavior of luminescent silicates against water, air humidity, water steam or polar solvents.

The disadvantage of the strong temperature dependence can be overcome by changing the composition of the phosphor and additionally by introducing copper into such a tetragonal silicate matrix and by preparing special non stoichiometric copper Alkaline Earth Silicates with a high temperature calcinations procedure.

The present invention provides high temperature stable tetragonal Copper Alkaline Earth Silicate phosphors activated by at least divalent Europium which emits light within the range of 500 nm to 630 nm and a manufacturing method thereof. These phosphors show a better stability against water and humidity and can be used with advantage for high brightness LED applications. The phosphors are represented as the following formula 1.

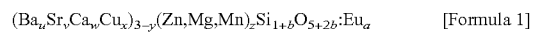

$$(Ba_uSr_vCa_wCu_x)_{3-y}(Zn,Mg,Mn)_zSi_{1+b}O_{5+2b}:Eu_a \qquad [\text{Formula 1}]$$

A tetragonal non stoichiometric silicate is provided where Copper is basically an essential part of the matrix with $u+v+w+x=1$, $y=z+a$, $z\leq 2$, $0<x\leq 1$, $0<a\leq 0.5$ and $0<b<0.5$.

The phosphors may be made by a multi-step high temperature solid state reaction between the starting materials comprising a surplus of $SiO_2$ and metal compounds, e.g. metal oxides and metal carbonates, which decompose at high temperatures into oxides. The high temperature solid state reaction may be performed between 800° C. and 1550° C.

Advantageous Effect

According to embodiments of the present invention, more stable silicate phosphors with a more rigid surrounding of the activator ions in a Silicate matrix and with high temperature stability and lower sensitivity against humidity can be provided. Furthermore, high temperature stable tetragonal Copper Alkaline Earth Silicate phosphors activated by at least divalent Europium which emits light between about 500 nm to 630 nm and a manufacturing method thereof can be provided. In addition, luminescent tetragonal Copper Alkaline Earth Silicate for LED applications, which have high color temperature range from about 2,000K to 8,000K or 10,000K showing a CRI of 80~95, especially 90~95, when mixed together with other phosphors, can be provided.

Embodiments of the Invention

Example 1

Manufacturing method of the luminescent material represented following formula 2 is described.

$$Cu_{0.05}Sr_{2.91}Si_{1.05}O_{5.1}:Eu_{0.04} \quad \text{[Formula 2]}$$

As starting materials for 1 Mol phosphor, CuO (3.98 g), $SrCO_3$ (429.60 g), $SiO_2$ (63.09 g), $Eu_2O_3$ (14.08 g) and/or any combinations thereof are used. The starting materials in form of very pure oxides as well as carbonates are mixed with the appropriate surplus of Silica together with small amounts of flux ($NH_4Cl$—16 g). In a first step, the mixture is fired in an alumina crucible at 1,350° C. in an inert gas atmosphere ($N_2$ or noble gas) for 2~4 hours. After pre-firing, the material is milled. In a second step, the mixture is fired in an alumina crucible at 1,350° C. in weakly reducing atmosphere for additional 4 hours. Then, the material is milled, washed, dried and sieved. The luminescent material has an emission maximum at about 580 nm (shown in FIG. 2), and crystallizes in the tetragonal structure (shown in FIG. 3) which is clearly different from the Orthosilicates (shown in FIGS. 4 and 5).

In table 1, results of the X-ray diffraction analysis are written down. There is evidence from FIG. 3-6 and table 1 that the structure has been changed caused by non-stoichiometry and Copper.

This difference can also be seen clearly by comparing FIG. 3 for a non-stoichiometric and FIG. 7 for a stoichiometric Oxy-Orthosilicate, especially for the diffraction pattern in the region $2\Theta=32–42°$.

(14.08 g) and/or any combinations thereof are used. The starting materials in form of very pure oxides as well as carbonates are mixed with a surplus of Silica together with small amounts of flux ($NH_4Cl$—26.7 g). In a first step, the mixture is fired in an alumina crucible at 1,300° C. in an inert gas atmosphere for 2~6 hours. After pre-firing, the material is milled again. In a second step, the mixture is fired in an alumina crucible at 1,385° C. in weakly reducing atmosphere for additional 6 hours. Then, the material is milled, washed, dried and sieved. The luminescent material has an emission maximum at 600 nm (←−582 nm) (shown in FIG. 2). The structure is analogously to example 1 as shown in table 1 and FIG. 3.

By substitution of only 0.2 Mol Barium for Strontium results in an emission between 1 and 3 in FIG. 2 and to a change in the structure.

Example 3

Manufacturing method of the luminescent material represented following formula 4 is described.

$$Cu_{0.03}Sr_{2.92}Ca_{0.01}Si_{1.03}O_{5.06}:Eu_{0.04} \quad \text{[Formula 4]}$$

As starting materials, CuO (5.57 g), $SrCO_3$ (431.08 g), $CaCO_3$ (1.0 g), $SiO_2$ (61.89 g), $Eu_2O_3$ (14.08 g) and/or any combinations thereof are used. The starting materials in form of very pure oxides as well as carbonates are mixed with a surplus of Silica together with small amounts of flux ($NH_4$—24 g). In a first step, the mixture is fired in an alumina crucible at 1,300° C. in an inert gas atmosphere for 2~6 hours. After pre-firing, the material is milled again. In a second step, the mixture is fired in an alumina crucible at 1,370° C. in weakly

TABLE 1

Powder X-ray spacing of the 15 strongest reflections (Cu—$K_{\alpha1}$ radiation) of some Silicate phosphors compared with data from Literature.

| No. | stoichiometric $Sr_3SiO_5$ * [Å] | Non-stoichiometric Orthosilicate $Sr_{1.78}Ba_{0.16}Eu_{0.06}$ $Si_{1.04}O_{4.08}$ [nm] | Non-stoichiometric Ortho-Disilicate $Ba_{2.44}Sr_{0.5}MgEu_{0.06}$ $Si_{2.07}O_{8.14}$ [nm] | Non-stoichiometric Oxy-orthosilicate $Sr_{2.94}CU_{0.02}Eu_{0.04}$ $Si_{1.03}O_{5.06}$ [nm] | Non-stoichiometric Oxy-Orthosilicate $Sr_{2.74}Cu_{0.02}Ba_{0.2}$ $Eu_{0.04}Si_{1.03}O_{5.06}$ [nm] | Non-stoichiometric Oxy-Orthosilicate $Sr_{2.54}Cu_{0.02}Ba_{0.4}$ $Eu_{0.04}Si_{1.03}O_{5.06}$ [nm] |
|---|---|---|---|---|---|---|
| 1 | 3.595 | 0.4418 | 0.4023 | 0.5388 | 0.3642 | 0.3639 |
| 2 | 3.512 | 0.4063 | 0.2892 | 0.3633 | 0.2992 | 0.2988 |
| 3 | 2.967 | 0.3300 | 0.2793 | 0.2990 | 0.2927 | 0.2925 |
| 4 | 2.903 | 0.3042 | 0.2293 | 0.2923 | 0.2701 | 0.2707 |
| 5 | 2.675 | 0.2904 | 0.2007 | 0.2693 | 0.2461 | 0.2458 |
| 6 | 2.444 | 0.2847 | 0.1821 | 0.2460 | 0.2354 | 0.2356 |
| 7 | 2.337 | 0.2831 | 0.1771 | 0.2352 | 0.2201 | 0.2199 |
| 8 | 2.187 | 0.2416 | 0.1687 | 0.2201 | 0.1899 | 0.1898 |
| 9 | 1.891 | 0.2328 | 0.1630 | 0.1816 | 0.1818 | 0.1820 |
| 10 | 1.808 | 0.2176 | 0.1612 | 0.1771 | 0.1774 | 0.1778 |
| 11 | 1.660 | 0.2055 | 0.1395 | 0.1703 | 0.1705 | 0.1707 |
| 12 | 1.589 | 0.2030 | 0.1338 | 0.1667 | 0.1667 | 0.1666 |
| 13 | 1.522 | 0.1889 | 0.1282 | 0.1595 | 0.1598 | 0.1602 |
| 14 | 1.489 | 0.1842 | 0.1256 | 0.1568 | 0.1569 | 0.1569 |
| 15 | 1.343 | 0.1802 | 0.1206 | 0.1526 | 0.1527 | 0.1528 |

* Data from Literature for $Sr_3SiO_5$ in Å (10 Å = 1 nm): R. W. Nurse, J. Appl. Chem., 2, May, 1952, 244-246

Example 2

Manufacturing method of 1 Mol of the luminescent material represented following formula 3 is described.

$$Cu_{0.02}Sr_{2.54}Ba_{0.4}Si_{1.03}O_{5.06}:Eu_{0.04} \quad \text{[Formula 3]}$$

As starting materials for 1 Mol phosphor, CuO (1.59 g), SrCO3 (375.0 g), $BaCO_3$ (78.94 g), $SiO_2$ (61.89 g), $Eu_2O_3$ reducing atmosphere for additional 6 hours. Then, the material is milled, washed, dried and sieved. The luminescent material has an emission maximum at 586 nm.

In the following table 2, Relative brightness of various non stoichiometric Copper Alkaline Earth Silicates at 25° C., 100° C., 125° C. and 150° C. compared with YAG and common Silicate phosphors under 455 nm excitation is summarized.

TABLE 2

Relative brightness of non-stoichiometric Copper Alkaline Earth Silicates at 25° C., 100° C., 125° C. and 150° C. compared with YAG and common Silicate phosphors under 455 nm excitation

| Composition | Excitation wavelength (nm) | Emission Maximum (nm) | 25 °C. | 100° C. | 125 °C. | 150 °C. |
|---|---|---|---|---|---|---|
| YAG | 455 | 562 | 100 | 92 | 86 | 79 |
| $(Ba,Sr)_2SiO_4$:Eu(565 nm) | 455 | 565 | 100 | 92 | 78 | 63 |
| $(Sr,Ca)_2SiO_4$:Eu(612 nm) | 455 | 612 | 100 | 87 | 73 | 57 |
| $Sr_{2.96}SiO_5$:$Eu_{0.04}$ | 455 | 582 | 100 | 96 | 94 | 90 |
| $Cu_{0.05}Sr_{2.91}Si_{1.05}O_{5.1}$:$Eu_{0.04}$ | 455 | 580 | 100 | 98 | 97 | 94 |
| $Cu_{0.05}Sr_{2.51}Ba_{0.4}Si_{1.03}O_{5.06}$:$Eu_{0.04}$ | 455 | 600 | 100 | 96 | 95 | 92 |
| $Cu_{0.07}Sr_{2.88}Ca_{0.01}Si_{1.03}O_{5.06}$:$Eu_{0.04}$ | 455 | 586 | 100 | 95 | 94 | 91 |
| $Cu_{0.1}Ba_{0.1}Sr_{2.56}Mg_{0.1}Mn_{0.1}Si_{1.06}O_{5.12}$:$Eu_{0.04}$ | 455 | 575 | 100 | 96 | 94 | 92 |
| $Cu_{0.1}Ba_{0.2}Sr_{2.46}Mg_{0.1}Ca_{0.1}Si_{1.08}O_{5.16}$:$Eu_{0.04}$ | 455 | 572 | 100 | 95 | 94 | 91 |
| $Cu_{0.2}Ba_{0.1}Sr_{2.56}Zn_{0.1}Si_{1.02}O_{5.04}$:$Eu_{0.04}$ | 455 | 574 | 100 | 97 | 95 | 93 |

Non-stoichiometric Oxy-Orthosilicates also show higher emission efficiency compared with the stoichiometric ones. In both cases the incorporation of $Cu^{2+}$ as host component leads to an improvement of brightness and emission efficiency as can be taken from FIG. 1 for typical orange emitting species.

In the following table 3, sensitivity of non stoichiometric Copper containing new phosphors against humidity and temperature compared to common Silicate phosphors is summarized. Here, the brightness is measured under 450 nm excitation wavelength with time exposed to the condition of 85° C. temperature and saturated humidity.

TABLE 3

Sensitivity of non stoichiometric Copper containing new phosphors against humidity and temperature compared to common Silicate phosphors

| | Brightness [%] | | | | | |
|---|---|---|---|---|---|---|
| Sample | 0 hrs | 24 hrs | 100 hrs | 200 hrs | 500 hrs | 1000 hrs |
| Commercial yellow Orthosilicate (565 nm) | 100 | 98.3 | 98.7 | 93.3 | 84.7 | 79.3 |
| Example 1 | 100 | 99.6 | 99.2 | 97.8 | 94.8 | 91.5 |
| Example 2 | 100 | 98.9 | 99.1 | 96.4 | 93.9 | 90.7 |
| Example 3 | 100 | 99.0 | 98.7 | 98.2 | 95.4 | 93.8 |

All new phosphors show a much better stability against water and humidity than common Orthosilicates as can be taken from table 3.

It will be apparent to those skilled in the art that various modifications and variations can be made in the fabrication and application of the present invention without departing from the spirit or scope of the invention. Thus, it is intended that the present invention cover the modifications and variations of this invention provided they come within the scope of the appended claims and their equivalents.

What is claimed is:

1. A non-stoichometric oxyorthosilicate phosphor having a tetragonal crystal structure and having more silicon in the crystal lattice than that in the crystal lattice of stoichiometric oxyorthosilicate phosphors having a tetragonal crystal structure, wherein the phosphor has the formula:

$(Ba_uSr_yCa_wCu_x)_{3-y}(Zn,Mg,Mn)_zSi_{1+b}O_{5+2b}$:$Eu_a$, wherein, u+v+w+x=1, y=z+a, z≦2, 0<x≦1, 0<a≦0.5 and 0<b<0.5.

2. A non-stoichometric alkaline earth silicate phosphor having a tetragonal crystal structure and having more silicon in the crystal lattice than that in the crystal lattice of stoichiometric oxyorthosilicate phosphors having a tetragonal crystal structure, wherein the phosphor comprises copper disposed within the crystal lattice and comprises europium as an activator.

3. The phosphor according to claim 1, wherein the phosphor has an excitation range of between 250 nm and 500 nm and an emission range of between 500 nm and 630 nm.

4. The phosphor according to claim 2, wherein the phosphor has the formula:

$(Ba_uSr_yCa_wCu_x)_{3-y}(Zn,Mg,Mn)_zSi_{1+b}O_{5+2b}$:$Eu_a$, wherein, u+v+w+x=1, y=z+a, z≦2, 0<x<1, 0<a≦0.5, and 0<b<0.5.

5. The phosphor according to claim 1, wherein the phosphor is excited by light having a first wavelength and emits light having a second wavelength that is longer than the first wavelength.

6. The phosphor according to claim 1, wherein the phosphor emits light having a wavelength between 500 nm and 630 nm.

7. A light emitting device comprising the phosphor of claim 1 and a light source to excite the phosphor.

8. The light emitting device according claim 7, wherein the light source emits blue light; and the light emitting device emits white light having a color temperature between 2000K and 10000K and a color rendering index (CRI) of Ra=8~95.

9. The phosphor according to claim 1, wherein the phosphor is made by a multi-step high temperature solid state reaction between starting materials comprising a surplus of $SiO_2$ and metal compounds that decompose at high temperatures into oxides.

10. The phosphor according to claim 9, wherein the temperature of the reaction is between 800° C. and 1550° C.

* * * * *